Jan. 10, 1950   F. J. WILLIAMS   2,494,023
LAMINATED BEARING
Filed Sept. 22, 1945

F. J. WILLIAMS
INVENTOR.

ATTORNEY

UNITED STATES PATENT OFFICE 2,494,023

LAMINATED BEARING

Floyd J. Williams, Dallas, Tex.

Application September 22, 1945, Serial No. 618,024

2 Claims. (Cl. 308—72)

This invention relates to shaft bearings and more particularly to laminated, self aligning bearings.

The principal object of the invention is to provide a bearing consisting essentially of a laminated bushing of suitable material, such as bronze, supported by or incased in an elastic, oil absorbing material such as felt. By dividing the bushing up into relatively thin sections resembling washers, and incorporating an elastic method of mounting, it has been found that the bearing will conform precisely to the shaft over its full area and will absorb shaft vibrations quietly without damage to itself. Moreover, more adequate lubrication is effected and retained over longer periods than may be expected from conventional bushing type bearings.

Another object of the invention is to provide a laminated bearing which, by virtue of the elastic or resilient mounting, the bushing, because of its small mass, is permitted to respond to lateral vibrations of the shaft and thus escape excess wear to which a rigidly mounted bushing is subjected, thus quieter operation and longer life result.

With the foregoing objects as paramount, the invention has further reference to certain features of accomplishment which will become apparent as the description proceeds, taken in connection with the accompanying drawings wherein.

Figure 1:
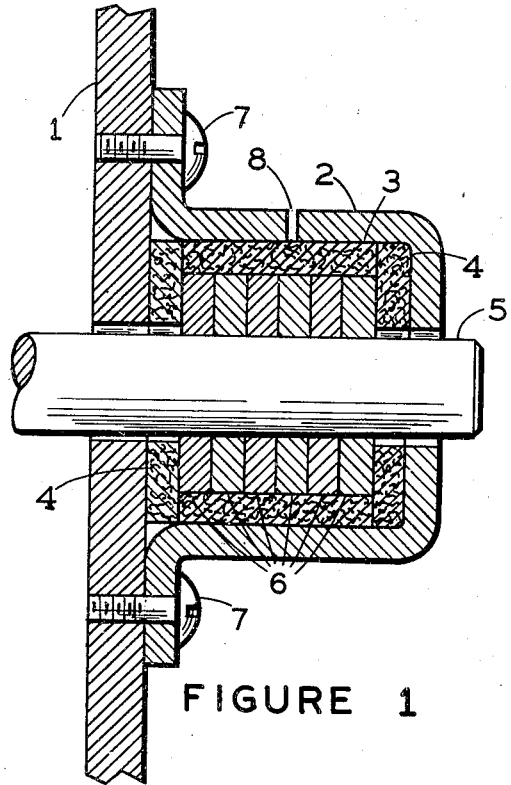
Figure 1 is a side elevational view in vertical section of a bearing constructed according to the invention.
Figure 2:
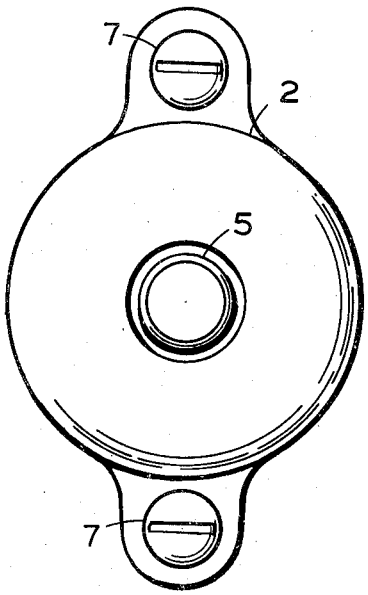
Figure 2 is an end elevational view.
Figure 3:
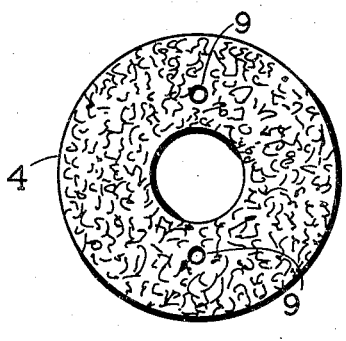
Figure 3 is a detail view of an end bearing thrust cushion.
Figure 4:
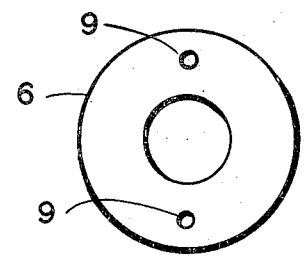
Figure 4 is a detail view of a single section of the laminated bearing.

Continuing with a more detailed description of the drawing, reference is primarily made to Figure 1 wherein numeral 1 denotes a machine housing, such as a motor case or the like and 2, the bearing housing.

Lining the interior of the housing 2 is a cushion 3 of elastic, oil absorbent material such as felt. At each end of the housing and conforming to the inner diameter thereof are washers 4 of the same material, that is, felt or other material having elastic and oil absorbing and retaining characteristics.

Surrounding a machine or motor shaft 5, extending into or through the housing 2 is a series of bearing laminations 6 of bronze or other suitable material. Because of their thin section, very close tolerances are feasible between each lamination 6 and the shaft 5. Since all laminations in the assembly can be made identical, the tolerance of the bushing assembly is precisely the same along its entire bearing surface. There can be no "tapering" or other irregularities such as might be present in a solid bushing. In other words, the total bearing surface is effective and there are are not just a few tight spots which apparently give a good fit to start with but which soon wear down and produce play in a solid type bushing. This feature alone contributes greatly to quieter operation and longer bearing life.

The combination of laminated construction 6 of the bushing and elastic mounting afforded by the felt cushioning 3 and 4, affords a flexible bearing assembly which conforms readily to small misalignments of the shaft 5 with respect to the machine housing 1. This self-aligning ability avoids abnormal bearing wear due to the binding effect sometimes encountered when assembling equipment using a rigid type bearing. Thus, use of the bearing of the present invention would result in faster, more economical assembly work by providing better shaft bearing alignment without expensive machining operations. Automatically correct alignment will naturally prolong the period of usefulness of the bearing.

It will be observed in Figure 1 that the interfaces between the laminations 6 interconnect the oil soaked cushion 3 with the bearing surface at closely spaced intervals. Thus, the oil absorbent material surrounding the bushing assembly, together with the large area represented by the interfaces of the laminations themselves, provide a high capacity oil reservoir system which keeps the shaft practically "floating" in oil along the entire bearing surface.

In addition to the great permeability or storage capacity for oil, the laminated bearing construction described has excellent retentive characteristics which allows the shaft to be well lubricated without excessive throwing of oil by centrifugal force, as commonly experienced when oiling the conventional solid type bushing. The bearing of the present invention will retain its oil over long periods of time and requires oiling only at infrequent intervals.

It will be noted in Figure 1 that the bearing housing 2 is secured to the machine or motor housing 1 by means of bolts or screws 7 and that the bearing is lubricated by means of an oil hole 8 in the bearing housing 2. Apertures 9 are provided in the laminations 6 and the thrust cushions 4 for use in tying the parts together with string when assembling.

Manifestly, the construction as shown and described is capable of some modification and such modification as may be construed to fall within the scope and meaning of the appended claims is also considered to be within the spirit and intent of the invention.

What is claimed is:

1. A self-aligning bearing comprising a housing embracing a shaft, a bushing surrounding said shaft in said housing consisting of a plurality of facially flush metallic rings of unbroken continuity and in juxtapositioned relationship, and a liner consisting of end washers of elastic, oil absorbing material and an intermediate cylindrical member of the same material, said washers and cylindrical member being adapted to yield to individual and collective lateral and radial displacement of said bushing ring in relation to said shaft.

2. A bearing, including in combination with a shaft, a housing embracing said shaft, a bushing encased in said liner consisting of juxtapositioned rings having plano faces and surrounding said shaft to respond to and absorb vibrations in said shaft, a liner comprising a cylindrical member of resilient, oil impregnated material, and washers of the same material at each end thereof, said liner being adapted to yield to movements of said bushing rings with respect to said shaft.

FLOYD J. WILLIAMS.

REFERENCES CITED

The following references are of record in the file of this patent:

UNITED STATES PATENTS

| Number | Name | Date |
| --- | --- | --- |
| 378,978 | Ryan | Mar. 6, 1888 |
| 2,059,891 | Morse | Nov. 3, 1936 |
| 2,368,886 | Schroeter | Feb. 6, 1945 |

FOREIGN PATENTS

| Number | Country | Date |
| --- | --- | --- |
| 440,825 | Great Britain | Jan. 7, 1936 |